US012307395B2

(12) United States Patent
Maekawa et al.

(10) Patent No.: US 12,307,395 B2
(45) Date of Patent: May 20, 2025

(54) TIMETABLE PLANNING SYSTEM AND TIMETABLE GENERATING METHOD

(71) Applicant: Hitachi, Ltd., Tokyo (JP)

(72) Inventors: Yuki Maekawa, Tokyo (JP); Ryota Sato, Tokyo (JP); Ryota Uematsu, Tokyo (JP); Tsuyoshi Minakawa, Tokyo (JP); Tomoe Tomiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 517 days.

(21) Appl. No.: 17/642,893

(22) PCT Filed: Sep. 10, 2020

(86) PCT No.: PCT/JP2020/034246
§ 371 (c)(1),
(2) Date: Mar. 14, 2022

(87) PCT Pub. No.: WO2021/111694
PCT Pub. Date: Jun. 10, 2021

(65) Prior Publication Data
US 2022/0358422 A1 Nov. 10, 2022

(30) Foreign Application Priority Data
Dec. 2, 2019 (JP) .................. 2019-217816

(51) Int. Cl.
*G06Q 10/047* (2023.01)
*B61L 27/16* (2022.01)
(Continued)

(52) U.S. Cl.
CPC ............ *G06Q 10/047* (2013.01); *B61L 27/16* (2022.01); *G06Q 10/063* (2013.01);
(Continued)

(58) Field of Classification Search
CPC ............... G06Q 10/047; G06Q 10/063; G06Q 10/06313; G06Q 10/10; G06Q 50/40; B61L 27/12; B61L 27/16
See application file for complete search history.

(56) References Cited

U.S. PATENT DOCUMENTS

2017/0116551 A1* 4/2017 Kubo ............... G06Q 10/06311
2018/0032964 A1 2/2018 Gkiotsalitis et al.

FOREIGN PATENT DOCUMENTS

CN 108090668 A * 5/2018 ............. B61L 27/00
JP 2001-5846 A 1/2001
(Continued)

OTHER PUBLICATIONS

International Search Report (PCT/ISA/210) issued in PCT Application No. PCT/JP2020/034246 dated Nov. 17, 2020 with English translation (five (5) pages).
(Continued)

*Primary Examiner* — Charles Guiliano
(74) *Attorney, Agent, or Firm* — Crowell & Moring LLP

(57) ABSTRACT

A timetable planning system 1 includes a storage device 13 and a computing device 11. The storage device 13 stores evaluation index improvement degree information 320 that stores relations between a change of each constituent element of an operation timetable on one hand and a change in quality of the operation timetable resulting from the change of each constituent element in terms of each operation timetable viewpoint on the other hand. The computing device 11 performs a changeable timetable element selection process of selecting the operation timetable constituent element that most improves the quality of the operation timetable, in reference to the evaluation index improvement degree information, an optimization model selection process of selecting, from among multiple timetable generating models each capable of generating the operation timetable,
(Continued)

the timetable generating model that most improves the quality of the whole operation timetable through the change of the selected constituent element, and a timetable optimization process of generating a new operation timetable based on the selected timetable generating model.

2 Claims, 14 Drawing Sheets

(51) Int. Cl.
- *G06Q 10/063* (2023.01)
- *G06Q 10/0631* (2023.01)
- *G06Q 10/10* (2023.01)
- *G06Q 50/40* (2024.01)
- *B61L 27/12* (2022.01)

(52) U.S. Cl.
CPC ....... *G06Q 10/06313* (2013.01); *G06Q 10/10* (2013.01); *G06Q 50/40* (2024.01); *B61L 27/12* (2022.01)

(56) References Cited

FOREIGN PATENT DOCUMENTS

| | | | |
|---|---|---|---|
| JP | 2007188222 A | * | 7/2007 |
| JP | 4727459 B2 | | 7/2011 |
| JP | 2013011976 A | * | 1/2013 |
| JP | 2014-210530 A | | 11/2014 |
| JP | 2018-22488 A | | 2/2018 |
| WO | WO 2019/078025 A1 | | 4/2019 |

OTHER PUBLICATIONS

Japanese-language Written Opinion (PCT/ISA/237) issued in PCT Application No. PCT/JP2020/034246 dated Nov. 17, 2020 (three (3) pages).
Office Action issued in Australian Application No. 2020396167 dated Feb. 10, 2023 (six (6) pages).
Cui, Y., "Simulation based hybrid model for a partially automatic dispatching of railway operation", University of Stuttgart, published 2010, < URL: https://elib.uni-stuttgart.de/bitstream/11682/356/1/Diss_YongCui.pdf > [1] (172 pages).
Extended European Search Report issued in European Application No. 20895964.3 dated Dec. 7, 2023 (9 pages).

* cited by examiner

FIG.3 PRE-REVISION/TARGET/RESULTING TIMETABLE INFORMATION  200,220,240
| ID | TRAIN ID | TRAIN TYPE | DEPARTURE AND ARRIVAL STATIONS | ARRIVAL TIME | DEPARTURE TIME |
|---|---|---|---|---|---|
| 0 | 0 | LOCAL | A | - | 10:00 |
| 1 | 0 | LOCAL | B | 10:10 | 10:15 |
| 2 | 0 | LOCAL | C | 10:25 | - |
| ... | ... | ... | ... | ... | ... |
FIG.4 PRE-REVISION/TARGET/RESULTING TIMETABLE
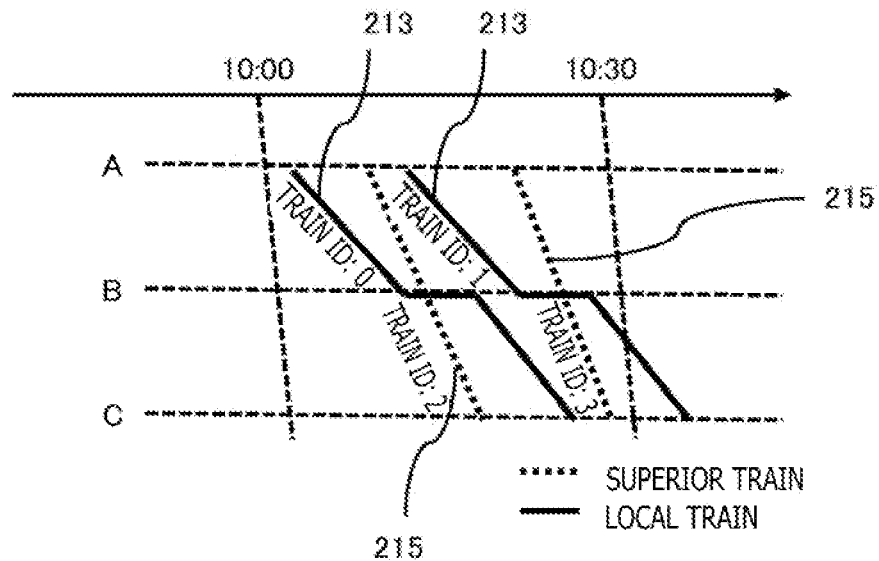
····· SUPERIOR TRAIN
——— LOCAL TRAIN
FIG.5 PASSENGER OD INFORMATION  260
| ENTRAINMENT/DETRAINMENT | A | B | C |
|---|---|---|---|
| A | - | 100 | 500 |
| B | 100 | - | 200 |
| C | 200 | 50 | |

FIG. 6    EVALUATION INDEX INFORMATION    280

| ID | APPELLATION | CALCULATION FORMULA |
|---|---|---|
| 0 | TRAIN CONGESTION RATE | NO. OF PASSENGERS ÷ TRAIN CAPACITY |
| 1 | TRAIN OPERATION COST | MILEAGE × ROLLING STOCK QUANTITY × COST |
| ... | ... | ... |

282, 284, 286

FIG. 7    EVALUATION INDEX IMPROVEMENT DEGREE INFORMATION    320

|  | NO. OF TRAINS | STOPPAGE TIME | CHANGE OF TRAIN TYPE | ... |
|---|---|---|---|---|
| TRAIN CONGESTION RATE | −100 | −10 | −50 | ... |
| TRAIN OPERATION COST | +100 | +10 | +50 | ... |
| ... | ... | ... | ... | ... |

322, 324, 326

FIG. 8    OPTIMIZATION MODEL INFORMATION    340

| ID | CHANGEABLE TARGET | IMPROVEMENT EVALUATION INDEX | OPTIMIZATION MODEL |
|---|---|---|---|
| 0 | NO. OF TRAINS | TRAIN CONGESTION RATE | MODEL A |
| 1 | STOPPAGE TIME | TRAIN CONGESTION RATE | MODEL B |
| ... | ... | ... | ... |

342, 344, 346, 348

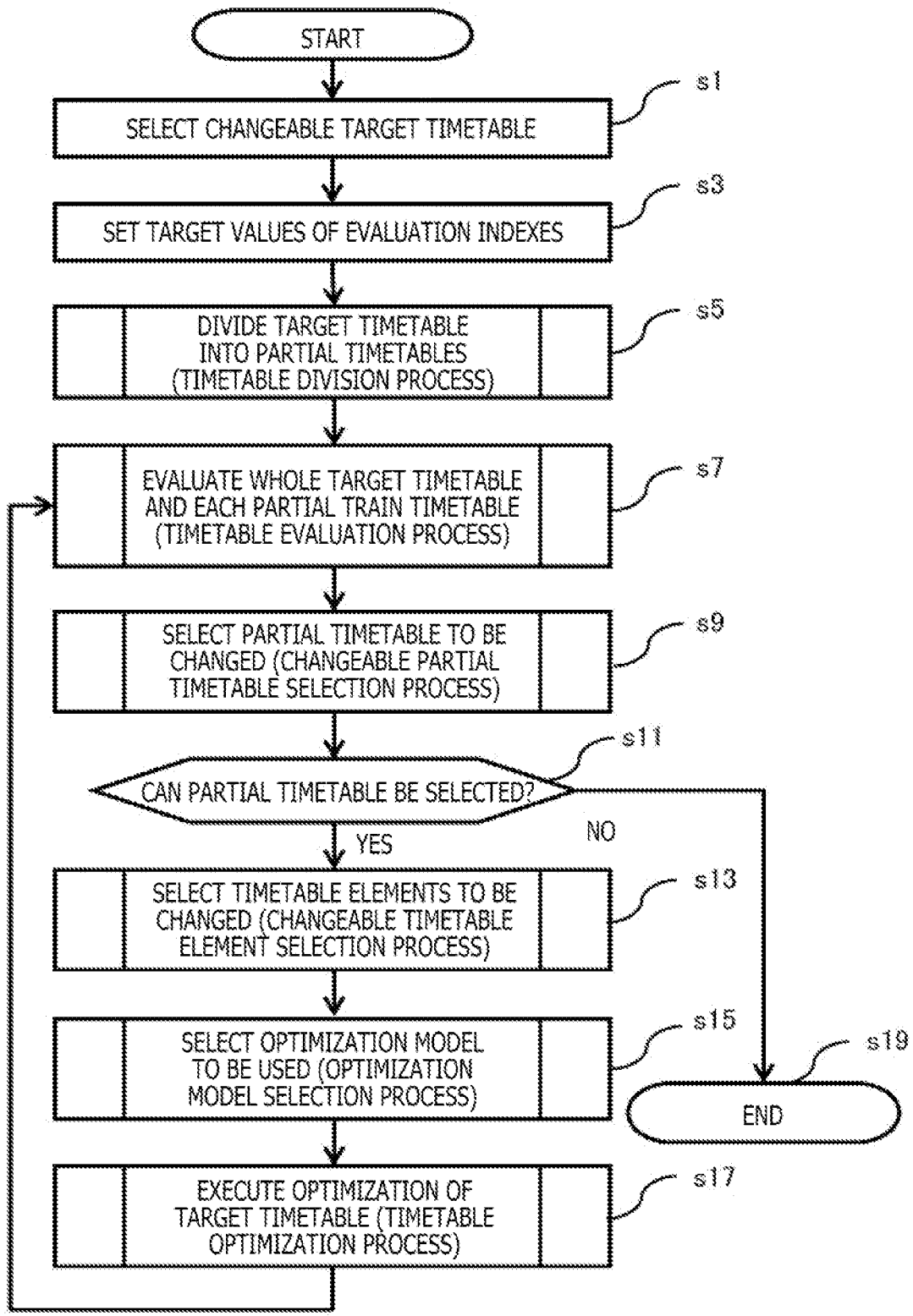
FIG.9 TRAIN TIMETABLE GENERATING PROCESS

FIG.10

EVALUATION INDEX TARGET SETTING INPUT SCREEN 1000

| SELECT | APPELLATION OF EVALUATION INDEX | TARGET VALUE | PRIORITY |
|---|---|---|---|
| ● | TRAIN CONGESTION RATE | 120% PER TRAIN OR LESS | 1 |
| ● | TRAIN OPERATION COST | ¥250,000 PER TRAIN OR LESS | 2 |
| ... | ... | | |

[READ SETTING FILE] [FINISH SETTINGS] [CANCEL]

EVALUATION INDEX TARGET SETTING INFORMATION 300

| ID | APPELLATION | CALCULATION FORMULA | TARGET VALUE | PRIORITY |
|---|---|---|---|---|
| 0 | TRAIN CONGESTION RATE | NO. OF PASSENGERS ÷ TRAIN CAPACITY | 120% PER TRAIN OR LESS | 1 |
| 1 | TRAIN OPERATION COST | MILEAGE × ROLLING STOCK QUANTITY | ¥250,000 PER TRAIN OR LESS | 2 |

302, 304, 306, 308, 310

TIMETABLE DIVISION PROCESS

TIMETABLE DIVISION CONDITION SCREEN 1100

| SELECT | APPELLATION OF DIVISION CONDITION | SETTING |
|---|---|---|
| ⦿ | TIME ZONE | PER HOUR |
| ○ | BY INTER-STATION SECTION | (STATION A TO STATION B), (STATION B TO STATION C) |
| ... | ... | |

[READ SETTING FILE] [FINISH SETTINGS] [CANCEL]

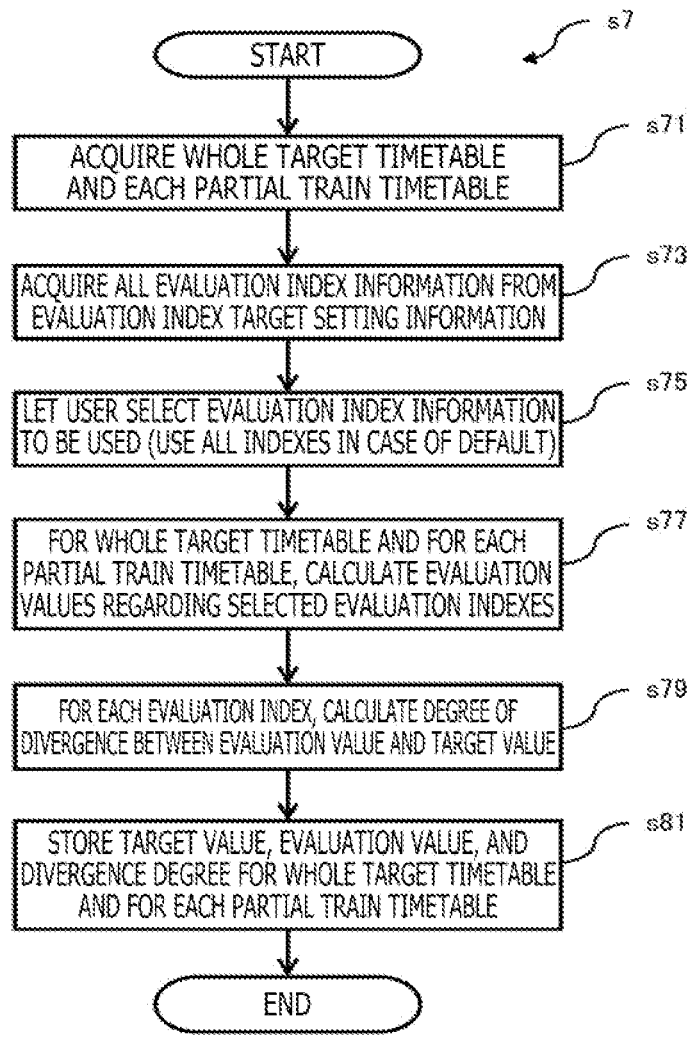
FIG. 14 TIMETABLE EVALUATION PROCESS
FIG. 15 EVALUATION INDEX DIVERGENCE DEGREE TEMPORARY INFORMATION

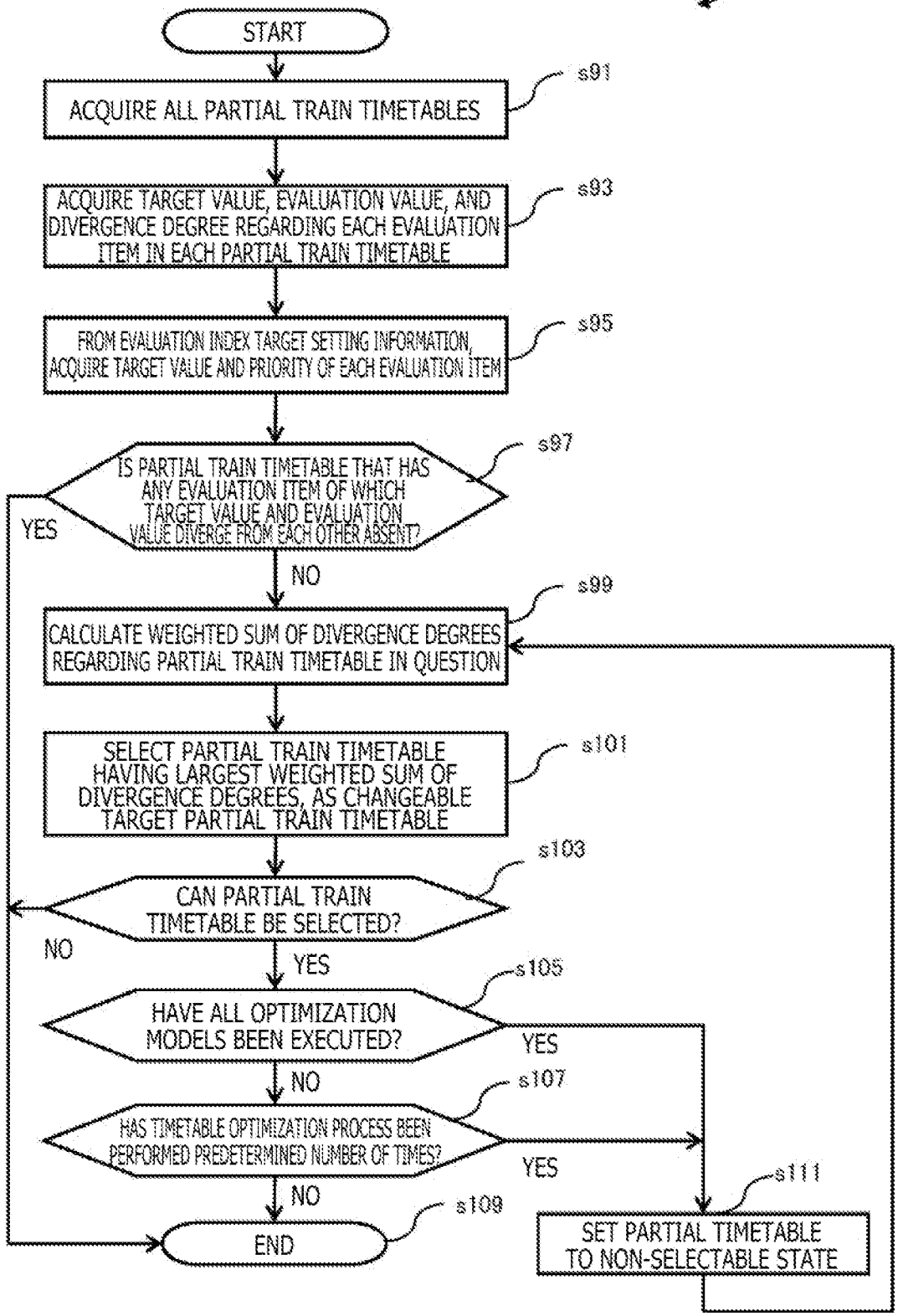
FIG. 17 CHANGEABLE PARTIAL TIMETABLE SELECTION PROCESS

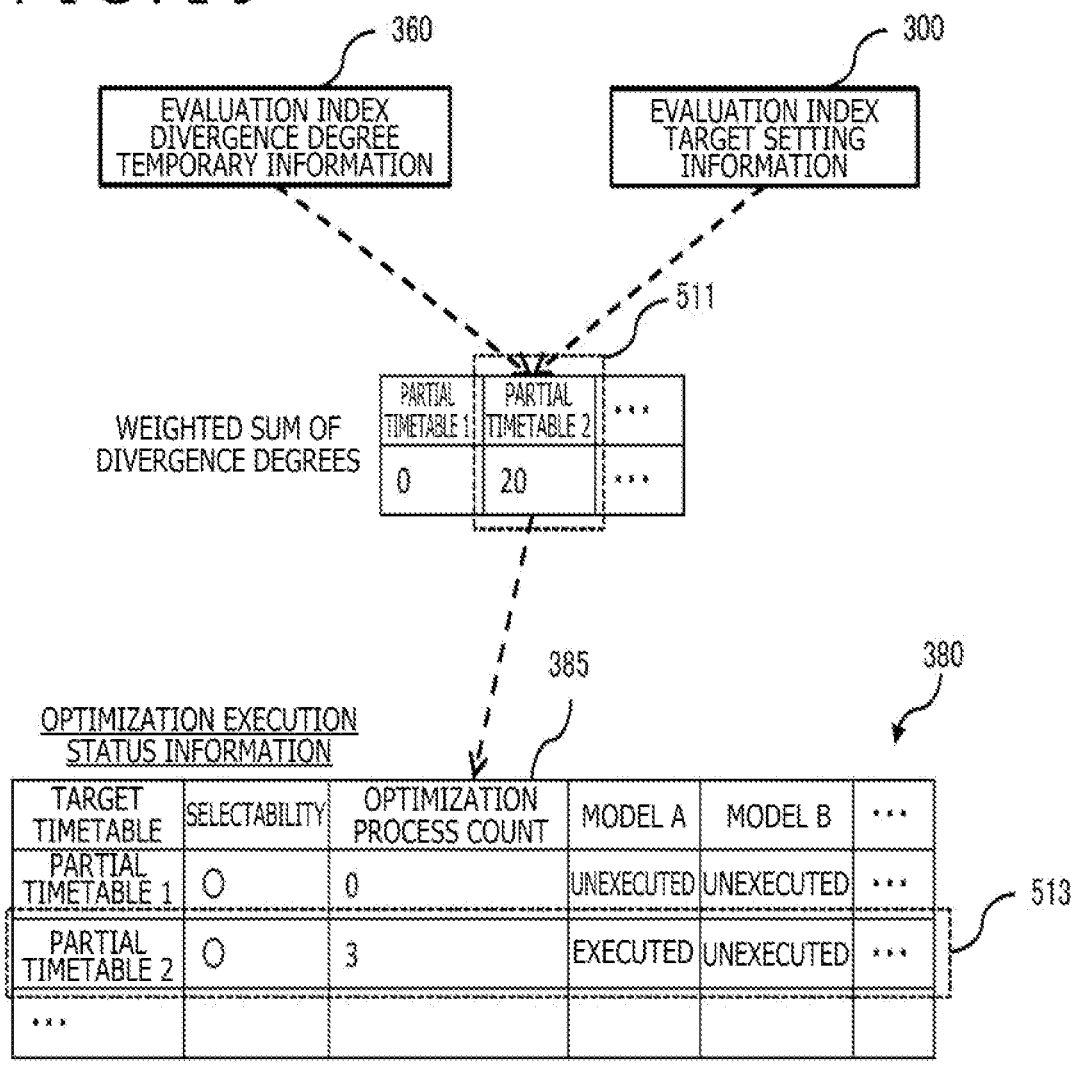

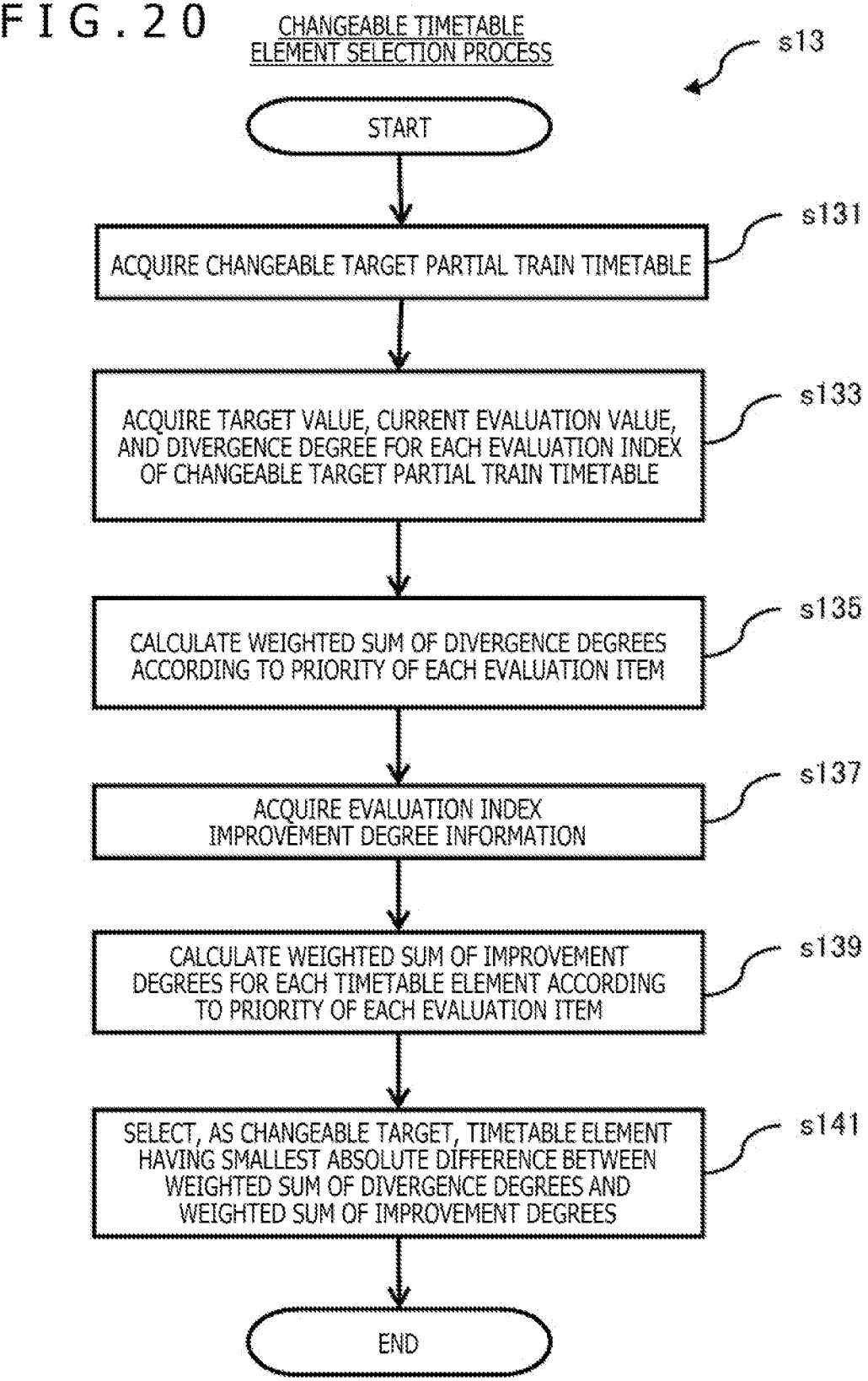

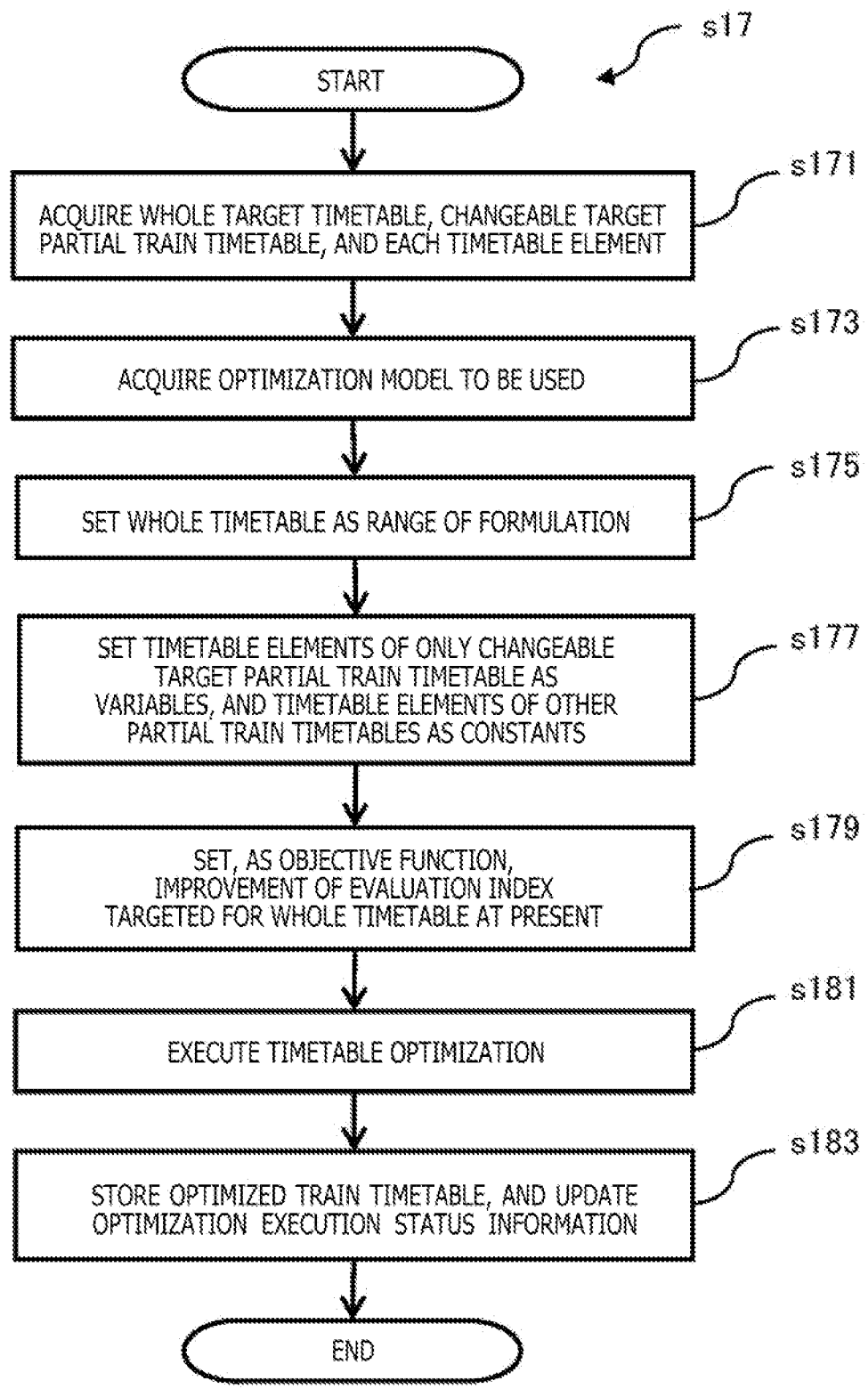
FIG.23 TIMETABLE OPTIMIZATION PROCESS

TIMETABLE PLANNING SYSTEM AND TIMETABLE GENERATING METHOD

CROSS-REFERENCE TO RELATED APPLICATIONS

This application is based upon and claims the benefit of priority from Japanese Patent Application No. 2019-217816, filed on Dec. 2, 2019, the entire contents of which are incorporated herein by reference.

TECHNICAL FIELD

The present invention relates to a timetable planning system and a timetable generating method.

BACKGROUND

Generally, the operators of public passenger transport such as railway and bus operators transport passengers to their destinations by actually operating a rolling stock according to predetermined operation timetables. For this reason, the quality of the operation timetable is crucially related to the evaluation by passengers of transport service. One important task for the operators is therefore to periodically revise operation timetables (i.e., timetable revision work) in order to improve the quality of the transport service.

At present, the timetable revision work involves aggregating or analyzing expressions of evidence such as questionnaires solicited from passengers, service logs submitted by crew, and surveys conducted in the field, in order to identify improvable areas in the workplace and to examine the operation timetable contents to be revised. That means the revision of operation timetables is a time-consuming heavily-loaded task. In addition, whereas experienced employees with specialized knowledge primarily have worked on timetable revision so far, today's increasingly complex railroad networks and diversifying passenger needs lead to an ever-increasing workload on these employees. It is thus increasingly difficult even for the seasoned workers to assess necessary information comprehensively. There have been cases in which revising the operation timetable failed to provide the intended effects.

Under these circumstances, studies have been underway to revise operation timetables by computers with automated timetable generating techniques. While manual operation timetable revision work can only modify the operation timetables in a limited manner, using the automation technology makes it possible to revise the timetables by combining diverse mathematical models (i.e., operation timetable generating models). This offers a possibility of dealing with more comprehensive timetable revision.

For example, Patent Document 1 describes techniques that allow passenger flow simulators to calculate the number of passengers with respect to timetables so that inefficient areas revealed thereby are determined under given determination conditions, in order to revise relevant timetables accordingly, the timetables being subsequently updated only if the total sum of passenger cost and operation cost is deemed to be improved as a result of the simulation.

It is desired to address or ameliorate one or more disadvantages or limitations associated with the prior art, or to at least provide a useful alternative.

Patent Document

Patent Document 1: Japanese Patent No. 4727459

SUMMARY

According to at least one embodiment of the present invention, there is provided a timetable planning system comprising:
a storage device; and
a computing device,
the storage device storing evaluation index improvement degree information that stores relations between a change of each of constituent elements of an operation timetable on one hand and a change in quality of the operation timetable resulting from the change of each of the constituent elements in terms of each of operation timetable viewpoints on the other hand,
the computing device performing
a changeable timetable element selection process of selecting the operation timetable constituent element that most improves the quality of the operation timetable, in reference to the evaluation index improvement degree information,
an optimization model selection process of selecting, from among a plurality of timetable generating models each capable of generating the operation timetable, the timetable generating model that most improves the quality of the whole operation timetable through the change of the selected constituent element, and
a timetable optimization process of generating a new operation timetable based on the selected timetable generating model,
wherein the computing device further performs a partial operation timetable selection process of dividing the operation timetable by a predetermined condition into a plurality of partial operation timetables, before selecting one of the divided partial operation timetables, and, in the optimization model selection process, the computing device selects, for the selected partial operation timetable, the timetable generating model that most improves the whole operation timetable following the changes of the constituent elements in the selected partial operation timetable.

According to at least another embodiment of the present invention the present invention, there is also provided a timetable generating method for causing an information processing apparatus to store evaluation index improvement degree information that stores relations between a change of each of constituent elements of an operation timetable on one hand and a change in quality of the operation timetable resulting from the change of each of the constituent elements in terms of each of operation timetable viewpoints on the other hand,
the timetable generating method further causing the information processing apparatus to perform:
a changeable timetable element selection process of selecting the operation timetable constituent element that most improves the quality of the operation timetable, in reference to the evaluation index improvement degree information;
an optimization model selection process of selecting, from among a plurality of timetable generating models each capable of generating the operation timetable, the timetable generating model that most improves the quality of the whole operation timetable through the change of the selected constituent element; and a timetable optimization process of generating a new operation timetable based on the selected timetable generating model, wherein the information processing apparatus is further caused to perform a partial operation timetable selection process of dividing the operation timetable by a predetermined condition into a plurality of partial operation timetables, before selecting one of the divided partial operation timetables, and, in the optimization model selection process, the information processing apparatus is further caused to select, for the selected partial operation timetable, the timetable generating model that most improves the whole operation timetable following the changes of the constituent elements in the selected partial operation timetable.

BRIEF DESCRIPTION OF THE DRAWINGS

One or more embodiments of the present invention are hereinafter described, by way of example only, with reference to the accompanying drawings, in which:

FIG. 3 is a tabular view listing an example of pre-revision timetable information.

FIG. 4 is a diagram schematically depicting an exemplary train timetable.

FIG. 5 is a tabular view listing an example of passenger OD information.

FIG. 6 is a tabular view listing an example of evaluation index information.

FIG. 7 is a tabular view listing an example of evaluation index improvement degree information.

FIG. 8 is a tabular view listing an example of optimization model information.

FIG. 9 is a flowchart explaining an example of a train timetable generating process.

FIG. 10 is a diagram depicting an example of an evaluation index target setting input screen.

FIG. 11 is a tabular view listing an example of evaluation index target setting information.

FIG. 14 is a flowchart explaining an example of a timetable evaluation process.

FIG. 15 is a tabular view listing an example of evaluation index divergence degree temporary information.

FIG. 17 is a flowchart explaining an example of a changeable partial timetable selection process.

FIG. 18 is a tabular view listing an example of optimization execution status information.

FIG. 19 is a diagram depicting an exemplary method of selecting a changeable target partial timetable in the changeable partial timetable selection process.

FIG. 20 is a flowchart explaining an example of a changeable timetable element selection process.

FIG. 23 is a flowchart explaining an example of a timetable optimization process.

DETAILED DESCRIPTION

Figure 1:
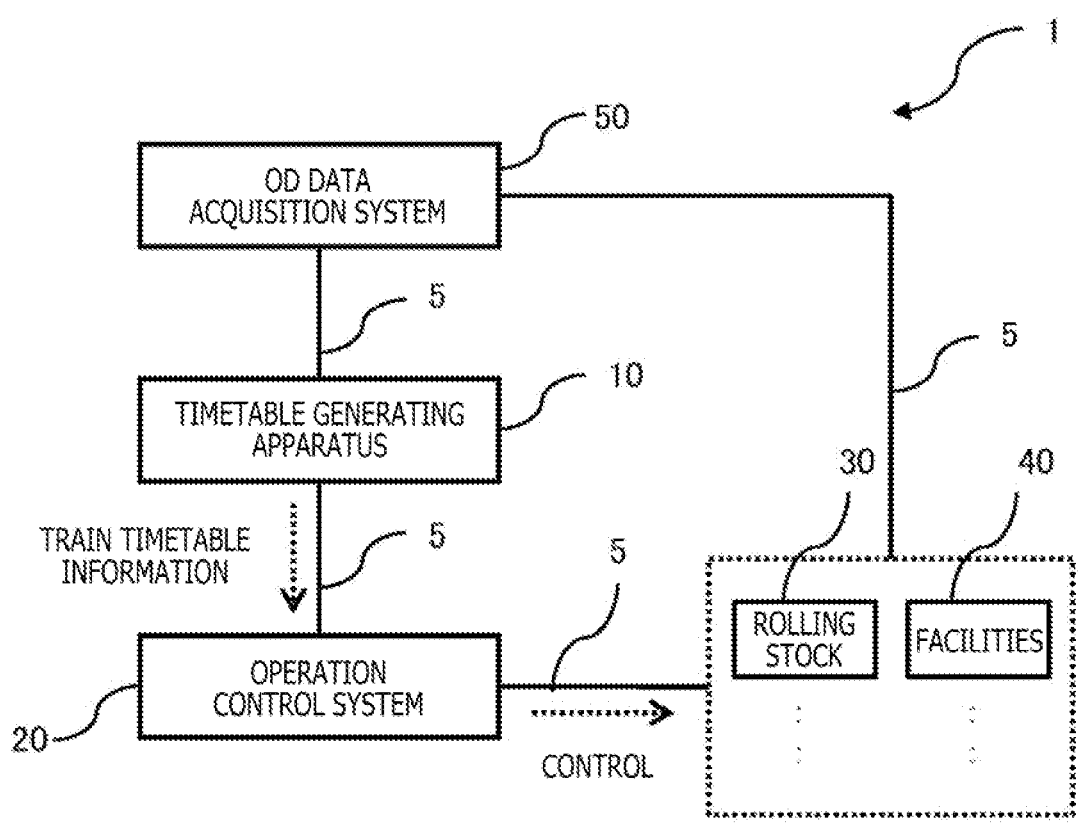
FIG. 1 is a view depicting an exemplary configuration of a timetable planning system embodying at least one aspect of the present invention.

The techniques described in Patent Document 1 require preparing databases of inefficient areas (e.g., complaints from passengers) and of detailed revisions of the operation timetables for improving the inefficient areas. Further, given that the operation timetables include diverse constituent elements (number of trains, stoppage times at stations, etc.), there are so many diverse patterns of changes in the operation timetables that it is difficult to identify all these changes comprehensively. Moreover, even when the changes in the operation timetables are identified, there is no scheme to guarantee the quality of the operation timetables to be generated according to these changes.

The present invention has been made in view of the above circumstances.

In addressing the above problem and according to one embodiment of the present invention, there is provided a timetable planning system including a storage device and a computing device, the storage device storing evaluation index improvement degree information that stores relations between a change of each of constituent elements of an operation timetable on one hand and a change in quality of the operation timetable resulting from the change of each of the constituent elements in terms of each of operation timetable viewpoints on the other hand, the computing device performing a changeable timetable element selection process of selecting the operation timetable constituent element that most improves the quality of the operation timetable, in reference to the evaluation index improvement degree information, an optimization model selection process of selecting, from among multiple timetable generating models each capable of generating the operation timetable, the timetable generating model that most improves the quality of the whole operation timetable through the change of the selected constituent element, and a timetable optimization process of generating a new operation timetable according to the selected timetable generating model.

According to another embodiment of the present invention, there is provided a timetable generating method for causing an information processing apparatus to store evaluation index improvement degree information that stores relations between a change of each of constituent elements of an operation timetable on one hand and a change in quality of the operation timetable resulting from the change of each of the constituent elements in terms of each of operation timetable viewpoints on the other hand, the timetable generating method further causing the information processing apparatus to perform a changeable timetable element selection process of selecting the operation timetable constituent element that most improves the quality of the operation timetable, in reference to the evaluation index improvement degree information, an optimization model selection process of selecting, from among multiple timetable generating models each capable of generating the operation timetable, the timetable generating model that most improves the quality of the whole operation timetable by a change of the selected constituent element, and a timetable optimization process of generating a new operation timetable according to the selected timetable generating model.

According to embodiments of the present invention, it is possible to generate a high-quality operation timetable even from complex constituent elements.

The foregoing and other problems and the solutions to these problems will become evident from a reading of the following detailed description of a preferred embodiment taken in conjunction with the appended drawings.

A preferred embodiment of the present invention is explained below with reference to the accompanying drawings.

<System Configuration>

FIG. 1 is a view depicting an exemplary configuration of a timetable planning system 1 embodying the present invention. The timetable planning system 1 is configured to include a timetable generating apparatus 10, an operation control system 20, a rolling stock 30, facilities 40, and an OD data acquisition system 50.

The timetable generating apparatus 10 is an information processing apparatus that generates an operation timetable of each rolling stock 30. The timetable generating apparatus 10 acquires OD data, to be discussed later, from the OD data acquisition system 50.

In this embodiment, the timetable generating apparatus 10 is assumed to be an apparatus that generates train timetables. Specifically, the rolling stock 30 is assumed to be trains, and the facilities 40 are assumed to be signals, railway tracks, points, and indicators.

The operation control system 20 performs processes of controlling the rolling stock 30 and facilities 40 related to train operation, according to the train timetable generated by the timetable generating apparatus 10.

The OD data acquisition system 50 includes one or multiple information processing apparatuses that acquire OD data from ticketing systems at stations, rolling stock 30, facilities 40, or various sensors (not depicted), for example.

The timetable generating apparatus 10, the operation control system 20, the rolling stock 30, the facilities 40, and the OD data acquisition system 50 are interconnected communicably via a wired or wireless communication network 5 such as a LAN (Local Area Network), WAN (Wide Area Network), the Internet, or leased lines.

Explained next are some hardware and functions included in the timetable generating apparatus 10.

<Timetable Generating Apparatus>

Figure 2:
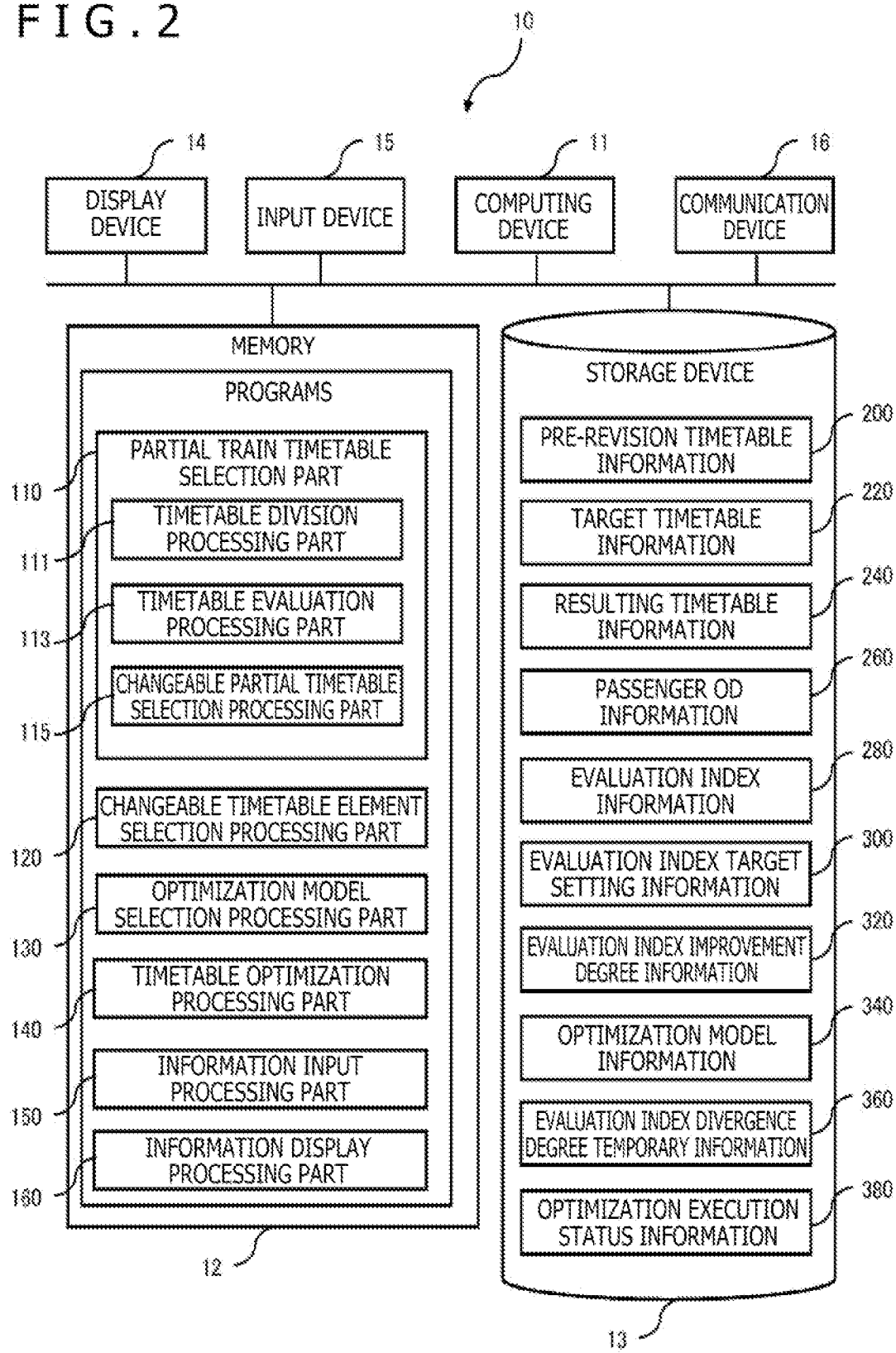
FIG. 2 is a view explaining examples of hardware and functions included in a timetable generating apparatus.

FIG. 2 is a view explaining examples of hardware and functions included in the timetable generating apparatus 10. The timetable generating apparatus 10 includes a computing device 11 such as a CPU (Central Processing Unit), a memory 12 such as a RAM (Random Access Memory) or a ROM (Read Only Memory), a storage device 13 such as an HDD (Hard Disk Drive) or an SSD (Solid State Drive), a display device 14 such as a display unit or a touch panel, an input device 15 such as a keyboard, a mouse, and/or a touch panel, and a communication device 16 that communicates with other information processing apparatuses. The other information processing apparatuses in the timetable planning system 1 are configured in a similar manner.

The timetable generating apparatus 10 has the function of storing pre-revision timetable information 200, target timetable information 220, resulting timetable information 240, passenger OD information 260, evaluation index information 280, evaluation index target setting information 300, evaluation index improvement degree information 320, optimization model information 340, evaluation index divergence degree temporary information 360, and optimization execution status information 380.

The pre-revision timetable information 200 is information regarding one or multiple train timetables currently in operation. The target timetable information 220 is train timetable information that is among the pre-revision timetable information 200 and that serves as the basis for a train timetable to be generated anew by the timetable generating apparatus 10. The resulting timetable information 240 is the train timetable (resulting timetable) information generated anew by the timetable generating apparatus 10.

(Train Timetable Information)

FIG. 3 is a tabular view listing an example of the pre-revision timetable information 200. The pre-revision timetable information 200 is a database including at least one record that includes a timetable ID item 201 to which a timetable identifier (timetable ID) is set, a train ID item 203 to which is set a train identifier (train ID) in the timetable related to the timetable ID item 201, a train type item 205 to which is set a train type (such as a local train and a superior train) indicated by the train ID item 203, a departure and arrival station item 207 to which is set information regarding departure and arrival stations for the train indicated by the train ID item 203, an arrival time item 209 to which is set the time at which the train indicated by the train ID item 203 arrives at the station denoted by the departure and arrival station item 207, and a departure time item 211 to which is set the time at which the train indicated by the train ID item 203 departs from the station denoted by the departure and arrival station item 207. The target timetable information 220 and the resulting timetable information 240 are configured in a similar manner.

FIG. 4 is a diagram schematically depicting an exemplary train timetable. As depicted in FIG. 4, this train timetable includes a local train 213 that stops at stations A, B, and C and a superior train 215 that departs from station A, passes station B non-stop, and arrives at station C.

Next, as depicted in FIG. 2, the passenger OD information 260 stores OD data. The OD data refers to data regarding, for example, volumes or time zones of entrainment and detrainment for each rolling stock 30 at each station. The passenger OD information 260 also stores cost information regarding the operation of the rolling stock 30. For example, the operation cost information refers to the ride fare between stations or the distance therebetween.

(Passenger OD Information)

FIG. 5 is a tabular view listing an example of the passenger OD information 260. The passenger OD information 260 includes multiple entrainment and detrainment tables 264 that store the number of passengers 262 entraining or detraining at each station. Each entrainment and detrainment table 264 is created at predetermined intervals (e.g., every 5 minutes).

Next, as indicated in FIG. 2, the evaluation index information 280 is information regarding methods of calculating each evaluation index as a parameter indicative of the quality from various viewpoints of train models.

(Evaluation Index Information)

FIG. 6 is a tabular view listing an example of the evaluation index information 280. The evaluation index information 280 includes at least one record that includes an ID item 282 to which an ID (item ID) of an evaluation index item (evaluation item or viewpoint) is set, an appellation item 284 to which the appellation of the evaluation item related to the ID item 282 is set, and a calculation formula item 286 to which is set the method of calculating an evaluation value of the evaluation item related to the ID item 282. The evaluation item refers to a train congestion rate or a train operation cost, for example. The train congestion rate and the train operation cost as the evaluation values are given, respectively, by calculation formulas of "number of passengers/train capacity" and "mileage×rolling stock quantity×cost." It is to be noted that the evaluation items and their calculation formulas are not limited to those described above. For example, the evaluation index information 280 may be set beforehand by users.

Next, as depicted in FIG. 2, the evaluation index target setting information 300 is information that stores a target evaluation value that is set for each evaluation index and a priority as a parameter indicative of the importance of that evaluation index. The evaluation index target setting information 300 will be discussed later in detail.

The evaluation index improvement degree information 320 is information that stores relations between a change of each constituent element (timetable element) of the operation timetable (train timetable) on one hand and the improvement in quality from various operation timetable viewpoints as a result of the change of that constituent element on the other hand (the improvement in quality refers to the degree of improvement of each evaluation item; the degree of improvement is a parameter indicative of how much the quality of the operation timetable has improved from diverse viewpoints, as will be discussed below in more detail).

(Evaluation Index Improvement Degree Information)

FIG. 7 is a tabular view listing an example of the evaluation index improvement degree information 320. The evaluation index improvement degree information 320 is information that stores an improvement degree 326 of each evaluation item 324 in the train timetable in the case where each timetable element 322 is changed by a unit quantity. In the example of FIG. 7, the timetable elements 322 are the number of trains, stoppage time, and change of train type, for example. In the train timetable, the evaluation items 324 are train congestion rate and train operation cost, for example. The evaluation index improvement degree information 320 is set beforehand by the user in view of operational realities, for example. It is to be noted that the combination of the timetable elements 322, the evaluation items 324, and the improvement degrees 326 is not limited to that indicated in the tabular view. The evaluation index improvement degree information 320 is created in advance by the user, for example.

The unit quantity refers to a predetermined amount of change in a parameter that characterizes a timetable element, for example. That is, the unit quantity may be the number of trains being incremented by 1, the stoppage time being prolonged by 1 minute, or the rolling stock being supplemented with another car for use, for example.

Next, as depicted in FIG. 2, the optimization model information 340 is information that stores the characteristics of each timetable generating model. The timetable generating model (referred to as the optimization model hereunder) is capable of generating a new train model in which at least one timetable element is improved. The evaluation index divergence degree temporary information 360 and the optimization execution status information 380 will be discussed later in detail.

(Optimization Model Information)

FIG. 8 is a tabular view listing an example of the optimization model information 340. The optimization model information 340 includes at least one record that includes an ID item 342 to which the identifier of an optimization model is set, a changeable target item 344 to which is set the timetable element that can be optimized by the optimization model related to the ID item 342, an improvement evaluation index item 346 to which is set the evaluation item of the train timetable that can be improved by the optimization model related to the ID item 342, and an optimization model item 348 to which is set the appellation of the optimization model related to the ID item 342. The optimization model information 340 is created beforehand by the user, for example.

Next, as depicted in FIG. 2, the timetable generating apparatus 10 has functional parts including a partial train timetable selection processing part 110, a changeable timetable element selection processing part 120, an optimization model selection processing part 130, a timetable optimization processing part 140, an information input processing part 150, and an information display processing part 160.

The partial train timetable selection processing part 110 divides the train timetable (target timetable information 220) into multiple partial train timetables according to given conditions, and selects one of the divided partial train timetables.

Specifically, the partial train timetable selection processing part 110 includes a timetable division processing part 111, a timetable evaluation processing part 113, and a changeable partial timetable selection processing part 115.

The timetable division processing part 111 divides the operation timetable by given division conditions (e.g., time zone, inter-station section, etc.) into multiple partial operation timetables (partial train timetables).

The timetable evaluation processing part 113 calculates the evaluation value of each of the divided partial train timetables in reference to predetermined evaluation criteria (calculation formulas in this case). For example, the timetable evaluation processing part 113 uses the calculation formulas for calculating the evaluation value for each of the evaluation indexes (e.g., congestion rate and operation cost) of the train timetables.

The changeable partial timetable selection processing part 115 selects the partial train timetable in reference to the evaluation values calculated by the timetable evaluation processing part 113 and the priority associated with the evaluation criterion being used. For example, by using the priorities set for the evaluation indexes, the changeable partial timetable selection processing part 115 selects the partial train timetable having an evaluation value that is related to a high-priority evaluation index and has a large divergence from a predetermined target value. In the description that follows, the partial train timetable to be selected in this manner will be referred to as the changeable target partial timetable.

The changeable timetable element selection processing part 120 selects the constituent element of the train timetable (referred to as the changeable target timetable element hereunder) that most improves the quality of the train timetable, in reference to the evaluation index improvement degree information 320 that stores the degrees of improvement.

The optimization model selection processing part 130 selects, from among multiple timetable generating models capable of generating train timetables, the timetable generating model that most improves the quality of the train timetable as a whole through the change of the constituent element selected (changeable target timetable element) by the changeable timetable element selection processing part 120.

At the time of timetable generating model selection, the optimization model selection processing part 130 selects the timetable generating model that most improves the quality of the whole timetable in the case where the above-mentioned change of the timetable constituent element is made in the partial operation timetables divided by the timetable division processing part 111.

The timetable optimization processing part 140 generates a new train timetable (resulting timetable information 240) based on the timetable generating model selected by the optimization model selection processing part 130.

The information input processing part 150 performs an information input process of accepting input, from the user, of the target information (target value) indicative of the improvements in the quality of the operation timetable corresponding to various operation timetable viewpoints (train congestion rate, train operation cost, etc.).

The information display processing part 160 displays information regarding the evaluation values of the partial train timetables calculated by the partial train timetable selection processing part 110.

The above-described functions of the timetable generating apparatus 10 are implemented by hardware of the timetable generating apparatus 10 or by the computing device 11 of the timetable generating apparatus 10 retrieving and executing relevant programs from the memory 12 or from the storage device 13. These programs are stored, for example, in a secondary storage device; in a storage device such as a nonvolatile semiconductor memory, a hard disk drive, or an SSD; or on a non-temporary data storage medium such as an IC card, an SD card, or a DVD that can be read by the timetable generating apparatus 10.

Explained next are the processes carried out by the timetable planning system 1.

<Train Timetable Generating Process>

FIG. 9 is a flowchart explaining an example of a train timetable generating process that generates a new train timetable by optimizing the current train timetable in reference to the evaluation index improvement degree information 320, for example. The train timetable generating process is started when predetermined user input is performed on the timetable generating apparatus 10, for example.

As indicated in FIG. 9, the timetable division processing part 111 of the timetable generating apparatus 10 refers to the pre-revision timetable information 200 to extract the train timetable to be revised (target timetable) and stores the extracted train timetable as the target timetable information 220 (s1). For example, the timetable division processing part 111 displays a list screen of the pre-revision timetable information 200 to let the user select the target timetable.

The timetable division processing part 111 sets a target evaluation value (s3) for each of the evaluation items in the train timetable to be generated anew from the target timetable. Specifically, the information input processing part 150 loads the evaluation index information 280 and thereby displays a screen through which the target value of each evaluation item (evaluation index target setting input screen) is to be input, accepting input, from the user, of the target value regarding each evaluation item and setting the input information in the evaluation index target setting information 300.

What follows is an explanation of the evaluation index target setting input screen and the evaluation index target setting information 300.

(Evaluation Index Target Setting Input Screen)

FIG. 10 is a diagram depicting an example of the evaluation index target setting input screen. An evaluation index target setting input screen 1000 includes an evaluation index display field 1002 that displays the appellation of each evaluation item, a target value input field 1004 that accepts input of the target value regarding each evaluation item, a priority input field 1006 that accepts input of the priority of each evaluation item, and an evaluation index selection field 1008 that accepts selection of each evaluation item. By selecting the evaluation index selection fields 1008 of desired evaluation items, the user can select the evaluation items for use as criteria in generating the new train timetable (resulting timetable).

(Evaluation Index Target Setting Information)

FIG. 11 is a tabular view listing an example of the evaluation index target setting information 300. The evaluation index target setting information 300 includes at least one record that includes an ID item 302 to which the identifier of the evaluation item (index ID) is set, an appellation item 304 to which the appellation of the evaluation item related to the ID item 302 is set (corresponding to the appellation item 284 in the evaluation index information 280), a calculation formula item 306 to which is set the calculation formula for the evaluation value of the evaluation item related to the ID item 302 (corresponding to the calculation formula item 286 in the evaluation index information 280), a target value item 308 to which the target value of the evaluation item related to the ID item 302 is set, and a priority item 310 to which the priority of the evaluation item related to the ID item 302 is set.

Next, as indicated by s5 in FIG. 9, the timetable division processing part 111 performs a timetable division process of dividing the train timetable (target timetable) acquired in s1 into multiple partial train timetables. The timetable division process will be discussed later in detail.

The timetable evaluation processing part 113 performs a timetable evaluation process (s7) of calculating the evaluation value of the target timetable and the evaluation values of the partial train timetables created in s5. The timetable evaluation process will be discussed later in detail.

In reference to the evaluation values calculated in s7, the changeable partial timetable selection processing part 115 performs a changeable partial timetable selection process (s9) of selecting, from among the target timetables, the partial train timetable to be revised (changeable target partial train timetable). The changeable partial timetable selection process will be discussed later in detail.

In a case where the changeable target partial train timetable cannot be selected in s9 (s11: No), the changeable partial timetable selection processing part 115 displays a predetermined warning message, for example, and terminates (s19) the train timetable generating process. On the other hand, in a case where the changeable partial timetable selection processing part 115 can select (s11: Yes) the changeable target partial train timetable in s9, the changeable timetable element selection processing part 120 performs the process described below.

That is, the changeable timetable element selection processing part 120 performs a changeable timetable element selection process (s13) of selecting, from among the timetable elements of the changeable target partial train timetable selected in s9, the timetable elements to be changed (changeable target timetable elements). The changeable timetable element selection process will be discussed later in detail.

The optimization model selection processing part 130 then performs an optimization model selection process (s15) of selecting the optimization model for use in generating a new train timetable (resulting timetable, in reference to the evaluation items for which the target values were set in s3 and the timetable elements selected in s13. The optimization model selection process will be discussed later in detail.

The timetable optimization processing part 140 performs a timetable optimization process (s17) of generating a new train timetable (revised timetable), in reference to the optimization model selected in s15. The timetable optimization process will be discussed later in detail. After this process, the processes subsequent to s7 are repeated.

The processes in the train timetable generating process are explained below in detail.

<Timetable Division Process>

Figures 12, 13:
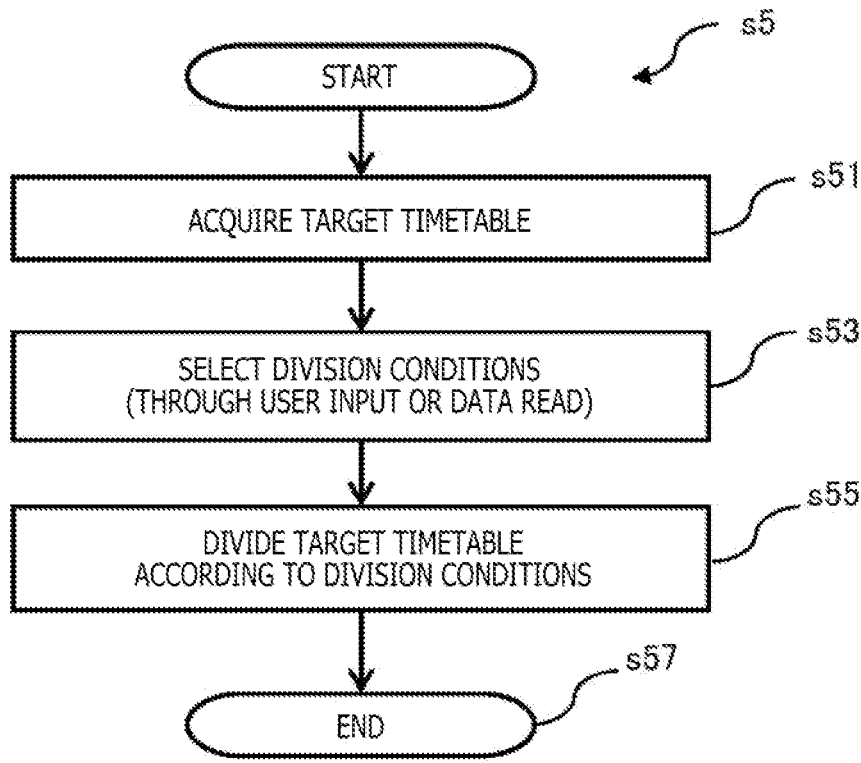
FIG. 12 is a flowchart explaining an example of a timetable division process.
FIG. 13 is a diagram depicting an example of a timetable division condition screen.

FIG. 12 is a flowchart explaining an example of the timetable division process. The timetable division processing part 111 acquires (s51) the target timetable, and determines (s53) the criteria (division conditions) for dividing the target timetable into partial train timetables. Specifically, the timetable division processing part 111 may load information regarding the division conditions stored beforehand, or display a predetermined input screen (timetable division condition screen) to accept designation of the division conditions from the user.

The timetable division processing part 111 then divides the target timetable into multiple parts (partial train timetables) according to the division conditions determined in s53. This terminates the timetable division process (s57).

The timetable division condition screen is explained hereunder.

(Timetable Division Condition Screen)

FIG. 13 is a diagram depicting an example of the timetable division condition screen. A timetable division condition screen 1100 includes a division condition appellation input field 1101 that accepts input of the appellation of each division condition from the user, a division condition input field 1103 that accepts input of the content of each division condition from the user, and a division condition selection field 1105 that accepts selection of each division condition from the user. Whereas FIG. 13 indicates the division by the time zone for the rolling stock 30 and the division by the inter-station section, both being the division conditions, other division conditions may alternatively be input, such as division by the route and division by the train type (local train, superior train, etc.).

<Timetable Evaluation Process>

Next, FIG. 14 is a flowchart explaining an example of the timetable evaluation process. The timetable evaluation processing part 113 acquires (s71) the target timetable and each partial train timetable created in the timetable division process. Also, the timetable evaluation processing part 113 acquires (s73) the evaluation index target setting information 300 created in s3.

In reference to the evaluation index target setting information 300 acquired in s73, the timetable evaluation processing part 113 selects (s75) the evaluation items for evaluating the quality of each train timetable (target timetable and each partial train timetable) obtained in s71. Specifically, the timetable evaluation processing part 113 may display the content of the evaluation index target setting information 300 on a predetermined screen, for example, to accept, from the user, selection of the evaluation items to be used. Alternatively, the timetable evaluation processing part 113 may select all evaluation items registered in the evaluation index target setting information 300.

For each of the evaluation items selected in s75, the timetable evaluation processing part 113 calculates (s77) the evaluation value regarding each of the train timetables (target timetable and each partial train timetable) acquired in s71.

The timetable evaluation processing part 113 then calculates (s79) the degree of divergence regarding each of the evaluation values calculated in s77. With this embodiment, the degree of divergence refers to how much divergence there is between the target value and the evaluation value. That is, the timetable evaluation processing part 113 acquires the target value set for each of the evaluation items from the evaluation index target setting information 300. The timetable evaluation processing part 113 proceeds to calculate, as the degree of divergence, the difference (divergence value) between the evaluation value of each of the evaluation items for the target timetable and for each partial train timetable, both being calculated in s77, on one hand and the target value of each acquired evaluation item on the other hand.

In a case where the evaluation value has achieved the target (where the evaluation value is higher than the target value), the degree of divergence may be considered to be zero. Alternatively, in place of the degree of divergence, a predetermined specification value (e.g., (target value-divergence value)/target value) may be adopted.

The timetable evaluation processing part 113 stores (s81) each evaluation value calculated in s77 and each degree of divergence computed in s79. For example, the timetable evaluation processing part 113 stores the calculated divergence degrees into the evaluation index divergence degree temporary information 360.

(Evaluation Index Divergence Degree Temporary Information)

FIG. 15 is a tabular view listing an example of the evaluation index divergence degree temporary information 360. The evaluation index divergence degree temporary information 360 stores information regarding the divergence degree 368 of each evaluation index 366 for a whole target timetable 362 and for each partial train timetable 364.

Figure 16:
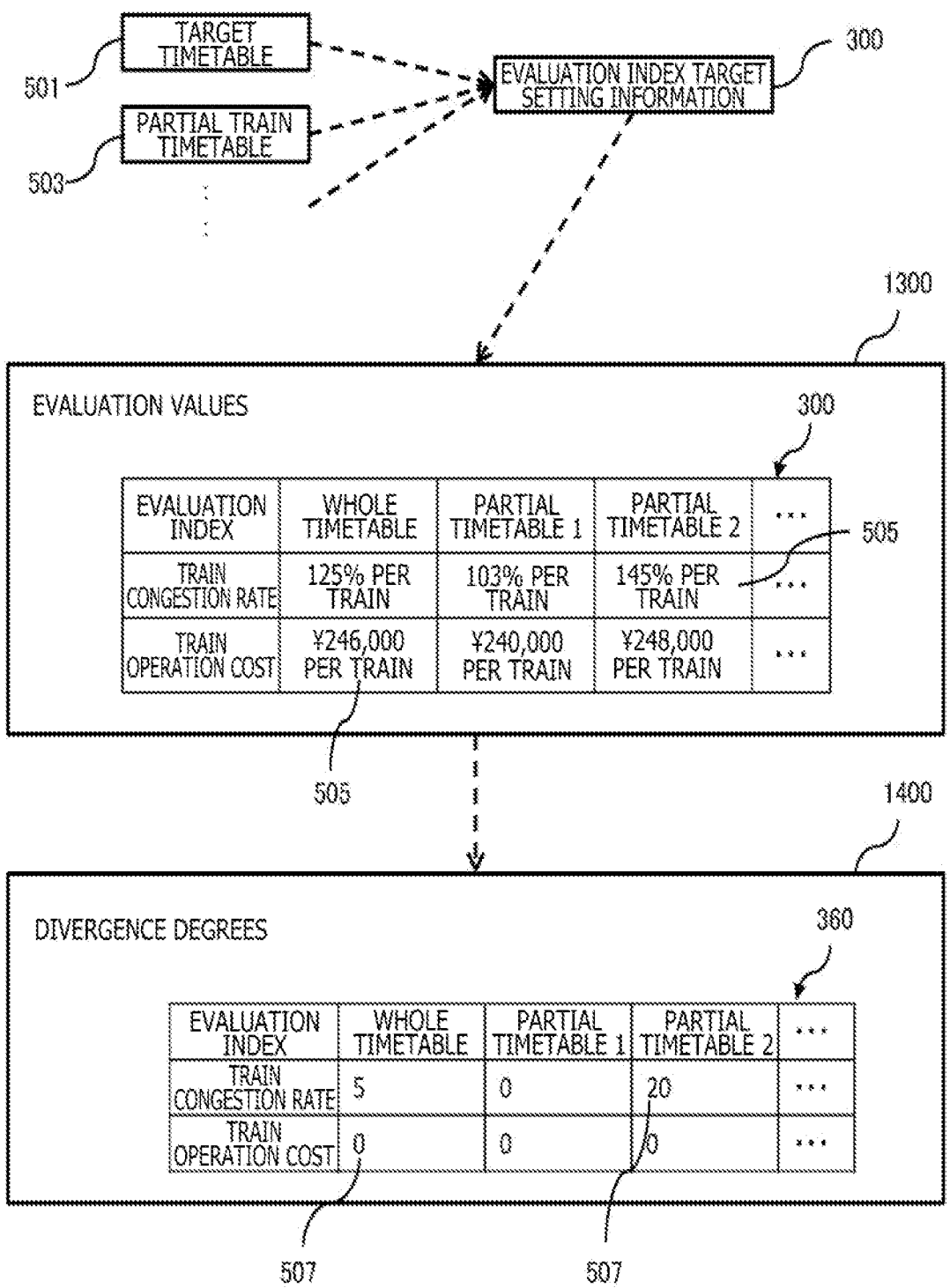
FIG. 16 is a diagram explaining an example of how to typically calculate evaluation values and divergence degrees.

Further, FIG. 16 is a diagram explaining an example of how to typically calculate evaluation values and divergence degrees. The timetable evaluation processing part 113 calculates the evaluation value 505 of each evaluation index in the target timetable 501 and in each partial train timetable 503 by inserting the content of the target timetable 501 and of each partial train timetable 503 in the calculation formula for each evaluation index indicated by the evaluation index target setting information 300. The timetable evaluation processing part 113 then calculates the divergence degree 507 corresponding to each of the calculated evaluation values 505 and stores the calculated divergence degrees 507 in the evaluation index divergence degree temporary information 360.

The information display processing part 160 may display the calculated evaluation value 505 of each evaluation index or the divergence degree 507 of each evaluation index on a predetermined screen 1300 or 1400, respectively.

<Changeable Partial Timetable Selection Process>

Next, FIG. 17 is a flowchart explaining an example of the changeable partial timetable selection process. The changeable partial timetable selection processing part 115 acquires (s91) all partial train timetables created in the timetable division process. The changeable partial timetable selection processing part 115 acquires (s93) the divergence degree of each evaluation index for the acquired partial train timetables. Specifically, the changeable partial timetable selection processing part 115 acquires the evaluation index divergence degree temporary information 360 created in the timetable evaluation process, for example.

Also, the changeable partial timetable selection processing part 115 acquires the target value and the priority of each evaluation index. Specifically, the changeable partial timetable selection processing part 115 acquires the evaluation index target setting information 300, for example.

The changeable partial timetable selection processing part 115 determines (s97) whether or not there is a divergence between the evaluation value and the target value for each partial train timetable. Specifically, the changeable partial timetable selection processing part 115 determines, for each partial train timetable, whether or not the divergence degree of each evaluation index acquired in s93 exceeds zero, for example.

In a case where any partial train timetable of which the evaluation value and the target value have a divergence therebetween is absent (s97: Yes), the changeable partial timetable selection process is terminated (s109). On the other hand, in a case where the partial train timetable of which the evaluation value and the target value have a divergence therebetween is not absent (s97: No), the changeable partial timetable selection processing part 115 selects all such partial train timetables and proceeds to perform the process described below.

That is, the changeable partial timetable selection processing part 115 calculates a weighted sum of the divergence degrees of each selected partial train timetable (399) to estimate the degree of necessity of optimizing the partial train timetable in question. Specifically, the changeable partial timetable selection processing part 115 carries out the calculations below on a partial train timetable i.

[Weighted sum of divergence degrees]$_i$=$\Sigma$evaluation index (divergence degree of each evaluation index)*10^(−(priority−1))

The changeable partial timetable selection processing part 115 selects (s101) the changeable target partial train timetable in reference to each of the weighted sums calculated in s99. Specifically, the changeable partial timetable selection processing part 115 may select, for example, the partial train timetable of which the weighted sum of the divergence degrees is the largest as the changeable target partial train timetable (changeable target partial timetable). In a case where non-selectable information is set to a record related to the relevant partial train timetable in the optimization execution status information 380, to be discussed later, the changeable partial timetable selection processing part 115 cannot select that record.

The changeable partial timetable selection processing part 115 determines (s103) whether or not the changeable target partial timetable is selected in the process of s101. In a case where the changeable target partial timetable is not selected (s103: No), the changeable partial timetable selection process is terminated (s109). In a case where the changeable target partial timetable is selected (s103: Yes), the changeable partial timetable selection processing part 115 determines (s105) whether or not all optimization models have been applied to the changeable target partial timetable. Specifically, the changeable partial timetable selection processing part 115 makes the determination by referring to a selectability item 383, a model application status item 387, etc., in the optimization execution status information 380, to be discussed later.

In a case where all optimization models have been applied to the changeable target partial timetable (s105: Yes), the changeable partial timetable selection processing part 115 sets (s111) the changeable target partial timetable to a non-selectable state. Specifically, the changeable partial timetable selection processing part 115 may, for example, set the non-selectable information to the changeable target partial train timetable in the optimization execution status information 380, to be discussed later. On the other hand, in a case where there is an optimization model that has not been applied to the changeable target partial timetable (s105: No), the changeable partial timetable selection processing part 115 performs the process in s107, to be described later.

The optimization execution status information 380 is explained hereunder.

(Optimization Execution Status Information)

FIG. 18 is a tabular view listing an example of optimization execution status information 380. The optimization execution status information 380 includes at least one record that includes a target timetable item 381 to which an identifier of a partial train timetable is set, a selectability item 383 to which is set information indicative of whether or not the partial train timetable related to the target timetable item 381 is selectable, an optimization process count item 385 to which is set the number of times an optimization model has been applied to the partial train timetable related to the target timetable item 381, and a model application status item 387 to which is set information indicative of whether or not each optimization model has been applied to the partial train timetable related to the target timetable item 381.

The changeable partial timetable selection processing part 115 then determines, as indicated by s107 in FIG. 17, whether or not the optimization model has been applied to the changeable target partial timetable at least as many times as a predetermined number of times. Specifically, the changeable partial timetable selection processing part 115 refers to, for example, the optimization process count item 385 and model application status item 387 of the record related to the changeable target partial timetable in the optimization execution status information 380.

In a case where the optimization model has been applied to the changeable target partial timetable at least as many times as the predetermined number of times (s107: Yes), the changeable partial timetable selection processing part 115 performs the above-described process of s111. On the other hand, in a case where the optimization model has not been applied to the changeable target partial timetable at least as many times as the predetermined number of times (s107: No), the changeable partial timetable selection processing part 115 terminates (s109) the changeable partial timetable selection process.

Here, FIG. 19 is a diagram depicting an exemplary method of selecting the changeable target partial timetable in the changeable partial timetable selection process. In reference to the evaluation index divergence degree temporary information 360 and the evaluation index target setting information 300, the changeable partial timetable selection processing part 115 calculates the weighted sum of the divergence degrees for "partial train timetable 1" and for "partial train timetable 2" to be 0 and 20, respectively. Of these partial train timetables, solely the "partial train timetable 2" with its weighted sum larger than 0 is extracted (as indicated by a reference sign 511). The changeable partial timetable selection processing part 115 then refers to the optimization execution status information 380 to verify that the optimization process count item 385 in a record 513 of the "partial train timetable 2" has a count smaller than the predetermined number of times. This timetable is eventually selected as the changeable target partial timetable.

<Changeable Timetable Element Selection Process>

Next, FIG. 20 is a flowchart explaining an example of the changeable timetable element selection process. The changeable timetable element selection processing part 120 acquires (131) the changeable target partial train timetable (changeable target partial timetable) selected in the changeable partial timetable selection process. Also, the changeable timetable element selection processing part 120 acquires (s133) the target value, the evaluation value, and the divergence degree for each evaluation item in the acquired changeable target partial timetable from the evaluation index target setting information 300 and from the evaluation index divergence degree temporary information 360, for example.

As in the case of the changeable partial timetable selection process, the changeable timetable element selection processing part 120 calculates (s135) the weighted sum of the divergence degrees for the changeable target partial timetable by use of the priority of each of the evaluation items.

The changeable timetable element selection processing part 120 further acquires (s137) the evaluation index improvement degree information 320. The changeable timetable element selection processing part 120 then calculates (s139) the weighted sum of the improvement degrees for each of the timetable elements in the changeable target partial timetable. Specifically, in reference to the evaluation index improvement degree information 320, the changeable timetable element selection processing part 120 uses the formula below, for example, to calculate the weighted sum of the improvement degrees for a timetable element i, and stores the weighted sums thus calculated.

[Weighted sum of improvement degrees for timetable element $i$]=$\Sigma_j$ (improvement degree of evaluation item $j$ for timetable element $i$)*10^(−(priority−1))

The changeable timetable element selection processing part 120 identifies, from among the timetable elements, the timetable element of which the absolute difference between the absolute value of the weighted sum of the improvement degrees calculated in s139 on one hand and the weighted sum of the divergence degrees computed in s135 on the other hand is the smallest. The timetable element thus identified is selected (s141) as the changeable target timetable element (changeable target timetable element).

Figure 21:
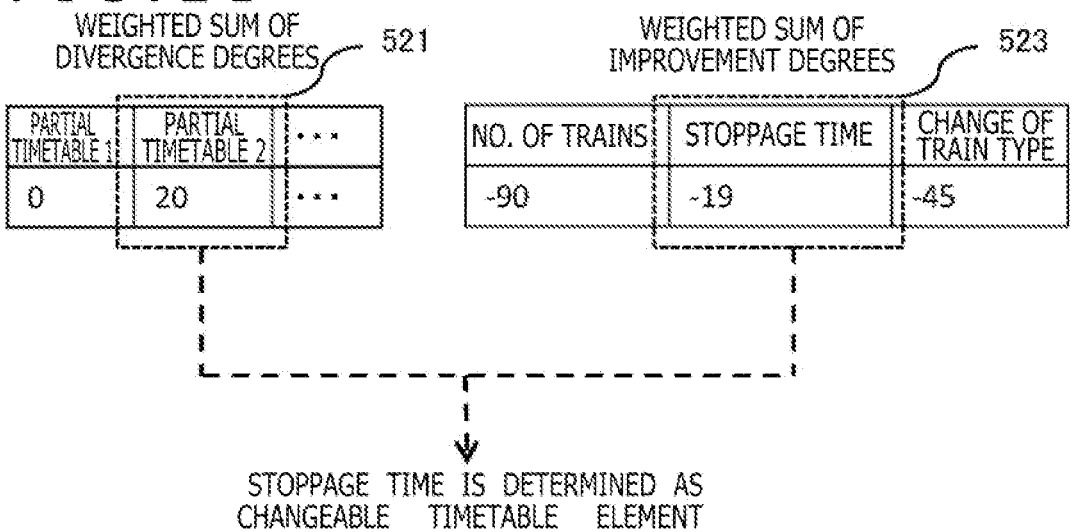
FIG. 21 is a diagram explaining an exemplary method of selecting a changeable target timetable element.

FIG. 21 is a diagram explaining an exemplary method of selecting the changeable target timetable element. The changeable timetable element selection processing part 120 selects a stoppage time 523 from among the timetable elements by comparing a weighted sum 521 (weighted sum "20") of the divergence degrees regarding the changeable target partial timetable, with the weight sum of the improvement degrees for the timetable elements (−90: number of trains; −19: stoppage time; −45: change of train type).

<Optimization Model Selection Process>

Figure 22:
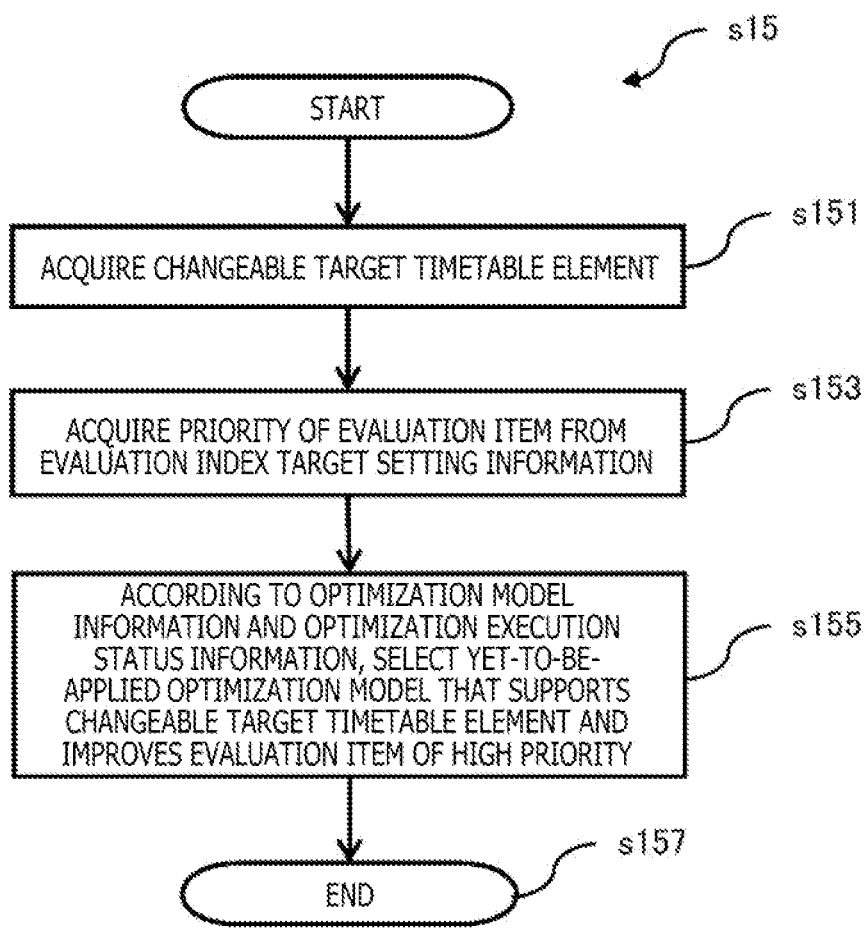
FIG. 22 is a flowchart explaining an example of an optimization model selection process.

Next, FIG. 22 is a flowchart explaining an example of the optimization model selection process. The optimization model selection processing part 130 acquires (s151) the changeable target timetable element (changeable target timetable element) selected in the changeable timetable element selection process. Also, the optimization model selection processing part 130 acquires (s153) information regarding the priority of each of the evaluation items from the evaluation index target setting information 300.

At this point, the optimization model selection processing part 130 selects the evaluation items of high priority. For example, the optimization model selection processing part 130 may allow the user to input the evaluation items of which the priority is deemed to be high, or may automatically select the information regarding the evaluation item with the highest priority.

Referring to the optimization model information 340, the optimization model selection processing part 130 selects (s155) the timetable generating model to be applied, according to the usage status and priority of each timetable generating model, before terminating the optimization model selection process (s157). Specifically, the optimization model selection processing part 130 acquires, for example, information regarding the optimization model item 348 (optimization model information) of that record in the optimization model information 340 in which the changeable target timetable element acquired in s151 is set to the changeable target item 344 and in which information regarding the evaluation items with high priority is set to the improvement evaluation index item 346. The optimization model selection processing part 130 then refers to the model application status item 387 in the optimization execution status information 380 to verify that the item of the optimization model acquired previously is set to "unexecuted," thereby selecting the optimization model as the timetable generating model to be applied.

<Timetable Optimization Process>

Next, FIG. 23 is a flowchart explaining an example of the timetable optimization process. The timetable optimization processing part 140 acquires (s171) information regarding the whole target timetable, information regarding the partial train timetable (changeable target partial timetable) selected in the changeable partial timetable selection process, the changeable target timetable element selected in the changeable timetable element selection process, and each timetable element of the train timetable. Also, the timetable optimization processing part 140 acquires (s173) the optimization model selected in the optimization model selection process (the model is referred to as the selected model hereunder).

In applying the selected model, the timetable optimization processing part 140 sets (s175) the "whole" target timetable as the range of formulation by the selected model.

Also, in applying the selected model, the timetable optimization processing part 140 sets each timetable element in the changeable target partial timetable, as a train timetable variable (decision variables), and the timetable elements in the other partial train timetables, as train timetable constants (s177). For example, the timetable optimization processing part 140 sets "constraint condition' x=constant (current value) if 'x is not included in the target partial timetable'" (x is a decision variable).

Also, in applying the selected model, the timetable optimization processing part 140 sets the objective function of the selected model as an evaluation function for calculating the evaluation value of the evaluation item for evaluating the changeable target timetable element in the "whole" target timetable. For example, in a case where the changeable target timetable element is "stoppage time," the timetable optimization processing part 140 uses an objective function F (x) as the calculation formula for "train congestion rate" of the "whole" target timetable.

By applying the selected model, the timetable optimization processing part 140 acquires (s177) an optimum solution to the objective function. Given the optimum solution, the optimization model generates a train timetable that minimizes the objective function, i.e., a new train timetable that optimizes the evaluation value of the evaluation index for the whole target timetable.

In a case where the optimum solution is obtained in s177, the timetable optimization processing part 140 stores (s179) the generated train timetable as a new train timetable (resulting timetable information 240). Also, the timetable optimization processing part 140 stores (s179) what was carried out in the optimization model selection process. For example, the timetable optimization processing part 140 increments by 1 the value of the optimization process count item 385 in the record related to the partial train timetable in the optimization execution status information 380, and sets to "executed" the value of the optimization model item acquired in s153 among the items held in the model application status item 387.

Thereafter, the timetable generating apparatus 10 updates the pre-revision timetable information 200 by using the generated resulting timetable information 240. Meanwhile, the operation control system 20 receives the resulting timetable information 240 and, in reference to the received information, controls the rolling stock 30 and the facilities 40. In this manner, the operation of the new train timetable indicated by the received information is implemented.

As explained above, the timetable planning system 1 of this embodiment selects the timetable elements that most improve the quality of the train timetable, in reference to the evaluation index improvement degree information 320 that stores the relations between the changes of the timetable elements in the train timetable on one hand and the changes in quality (changes in the degree of improvement for each evaluation item) resulting from such changes of the timetable elements in terms of various train timetable viewpoints on the other hand. The timetable planning system 1 further selects, from among multiple timetable generating models, the timetable generating model that most improves the quality of the whole train timetable as a result of the timetable element changes. In reference to the selected timetable generating model, the timetable planning system 1 plans a new train timetable.

As described above, when planning the new train timetable, the timetable planning system 1 of this embodiment selects the timetable elements (number of trains, stoppage time, etc.) necessary for most improving the quality of the train timetable, in reference to the evaluation index improvement degree information 320 regarding the degrees of improvement and, in reference to the selected timetable elements, selects the optimization model that most improves the quality of the train timetable. Because the operation timetable such as train timetables is complicated or huge in structure, whether or not the quality of the operation timetable is effectively improved (or how much the quality improves) may vary depending on the characteristic of each of the timetable elements. In view of this, the timetable generating apparatus 10 of this embodiment reliably selects the timetable elements expected to improve timetable quality and generates the operation timetable in reference to the selected timetable elements. That is, even where the operation timetable includes complicated constituent elements, the timetable planning system 1 of this embodiment can plan a high-quality operation timetable.

As described above, the timetable planning system 1 of this embodiment reliably improves the quality of the operation timetable including complicated constituent elements. Also, the timetable planning system 1 supports labor-saving automation for the employees engaged in timetable planning work. Even where there are diverse changeable targets (e.g., number of trains, stoppage time, passing/stop classification, destination change, et.) in the operation timetable, it is possible to improve the quality of (i.e., optimize) the operation timetable. Consequently, regardless of the experience or intuition of the workers involved, it is possible to plan a highly improved operation timetable that takes into account the business operator's viewpoint such as operation cost as well as the customer's viewpoint such as train congestion, and to operate the rolling stock accordingly.

The above-described embodiment has been described using specific examples for easy understanding of the present invention. This invention may not necessarily be limited to the configurations that include all the above-described constituents or structures. This invention is not limited to the above-described embodiment and may be implemented in diverse variations.

For example, whereas the above embodiment adopts the trains as the rolling stock 30, the invention also applies to other transport means such as buses or monorails that are run according to predetermined operation timetables.

The databases held in the timetable generating apparatus 10 may alternatively be stored in external information processing apparatuses (e.g., servers). The timetable generating apparatus 10 may then access these information processing apparatuses to obtain relevant information.

The foregoing description clarifies at least the following: That is, the timetable planning system 1 of this embodiment performs the partial train timetable selection process of dividing the train timetable by predetermined conditions into multiple partial train timetables and selecting one of the divided partial train timetables. In the optimization model selection process, the timetable planning system 1 may select the timetable generating model that most improves the quality of the whole train timetable following the above-described changes of the constituent elements in the divided partial train timetable.

As described above, after the timetable elements are changed in the selected partial train timetable following division from the train timetable, the timetable generating model that most improves the quality of the whole train timetable is selected. This makes it possible to efficiently plan an optimum train timetable. That is, because the operation timetable such as train timetables has a complicated configuration, performing the process of changing the timetable elements in the whole operation timetable amounts to an enormous processing load. Instead, taking into account only the case where timetable elements are changed in the partial train timetable resulting from division of the whole timetable makes it possible to generate a more optimal train timetable in a short period of time.

Alternatively, in the above-described partial train timetable selection process, the timetable planning system 1 of this embodiment may calculate the evaluation value for each of the divided partial train timetables according to a predetermined evaluation criterion and, in reference to the calculated evaluation values and the priority associated with the evaluation criterion, select one of the partial train timetables.

As described above, the evaluation value for each of the divided partial train timetables is calculated according to the predetermined evaluation criterion, and one of the partial train timetables is selected according to these evaluation values and the priority associated with the evaluation criterion. This makes it possible to reliably generate the partial train timetable necessary for generating the optimum train timetable.

As another alternative, the timetable planning system 1 of this embodiment may carry out the information input process of accepting input, from the user, of the target information regarding the improvement of the quality of the train timetable in a manner associated with each of the train timetable viewpoints.

As described above, the input of the target information regarding each evaluation item (target values) of the train timetable may be accepted from the user to generate the train timetable having a quality level in tune with the operational realities.

As another alternative, in reference to the above-described operation timetable generated anew, the timetable planning system 1 of this embodiment may perform the control process of controlling the rolling stock or the facilities related to operation.

The rolling stock 30 and the facilities 40 can be suitably operated by control based on the operation timetable generated as described above.

DESCRIPTION OF REFERENCE CHARACTERS

1: Timetable planning system
10: Timetable generating apparatus
11: Computing device
13: Storage device
320: Evaluation index improvement degree information
110: Partial train timetable selection processing part
120: Changeable timetable element selection processing part
130: Optimization model selection processing part
140: Timetable optimization processing part
150: Information input processing part
111: Timetable division processing part
113: Timetable evaluation processing part
115: Changeable partial timetable selection processing part Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A timetable planning system comprising:
a storage device; and
a computing device,
the storage device storing evaluation index improvement degree information that stores relations between a change of each of constituent elements of an operation timetable on one hand and a change in quality of the operation timetable resulting from the change of each of the constituent elements in terms of each of operation timetable viewpoints on another hand,
the computing device performing
a changeable timetable element selection process of selecting a constituent element of the constituent elements that most improves the quality of the operation timetable, in reference to the evaluation index improvement degree information,
an optimization model selection process of selecting, from among a plurality of timetable generating models each capable of generating the operation timetable, a timetable generating model that most improves the quality of the operation timetable through the change of the selected constituent element, and a timetable optimization process of generating a new operation timetable based on the selected timetable generating model;
wherein the computing device further performs a partial operation timetable selection process of dividing the operation timetable by a predetermined condition into a plurality of partial operation timetables, before selecting one of the partial operation timetables, and,
in the optimization model selection process, the computing device selects, for the selected partial operation timetable, the timetable generating model that most improves the operation timetable following the change of the constituent elements in the selected partial operation timetable,
wherein the computing device further performs a control process of controlling operation of a train and facilities related to the operation of the train based on the new operation timetable, the facilities including signals, railway tracks and indicators,
wherein, in the partial operation timetable selection process, the computing device calculates an evaluation value for each of the partial operation timetables according to a predetermined evaluation criterion, including a train congestion rate and a train operation cost, to select the partial operation timetable in reference to the calculated evaluation values and a priority associated with the evaluation criterion, and
wherein the computing device further performs an information input process of accepting input, from a user, of information regarding a target for improving the quality of the operation timetable corresponding to each of the operation timetable viewpoints, determines a degree of divergence between a target value and the evaluation value of the train congestion rate and a degree of divergence between a target value and the evaluation value of the train operation cost for each of the partial operation timetables, and selects the partial operation timetable based on the degrees of divergence.

2. A timetable generating method for causing an information processing apparatus to store evaluation index improvement degree information that stores relations between a change of each of constituent elements of an operation timetable on one hand and a change in quality of the operation timetable resulting from the change of each of the constituent elements in terms of each of operation timetable viewpoints on another hand,
the timetable generating method further causing the information processing apparatus to perform:
a changeable timetable element selection process of selecting a constituent element of the constituent elements that most improves the quality of the operation timetable, in reference to the evaluation index improvement degree information;
an optimization model selection process of selecting, from among a plurality of timetable generating models each capable of generating the operation timetable, a timetable generating model that most improves the quality of the operation timetable through the change of the selected constituent element; and
a timetable optimization process of generating a new operation timetable based on the selected timetable generating model;
wherein the information processing apparatus is further caused to perform a partial operation timetable selection process of dividing the operation timetable by a predetermined condition into a plurality of partial operation timetables, before selecting one of the partial operation timetables, and, in the optimization model selection process, the information processing apparatus is further caused to select, for the selected partial operation timetable, the timetable generating model that most improves the operation timetable following the change of the constituent elements in the selected partial operation timetable, wherein the information processing apparatus is further caused to perform a control process of controlling operation of a train and facilities related to the operation of the train based on the new operation timetable, the facilities including signals, railway tracks and indicators, and wherein, in the partial operation timetable selection process, the information processing apparatus is further caused to calculate an evaluation value for each of the partial operation timetables according to a predetermined evaluation criterion, including a train congestion rate and a train operation cost, to select the partial operation timetable in reference to the calculated evaluation values and a priority associated with the evaluation criterion, and wherein the information processing apparatus is further caused to perform an information input process of accepting input, from a user, of information regarding a target for improving the quality of the operation timetable corresponding to each of the operation timetable viewpoints, determine a degree of divergence between a target value and the evaluation value of the train congestion rate and a degree of divergence between a target value and the evaluation value of the train operation cost for each of the partial operation timetables, and select the partial operation timetable based on the degrees of divergence.

* * * * *